(12) United States Patent
Labrecque et al.

(10) Patent No.: US 12,365,473 B1
(45) Date of Patent: Jul. 22, 2025

(54) AIR INLET BARRIER FILTER FOR A HELICOPTER

(71) Applicant: PRATT & WHITNEY CANADA CORP., Longueuil (CA)

(72) Inventors: Michel Labrecque, Sainte-Julie (CA); Kevin Nguyen, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/604,720

(22) Filed: Mar. 14, 2024

(51) Int. Cl.
| | | |
|---|---|---|
| *B64D 33/02* | (2006.01) |
| *B01D 46/10* | (2006.01) |
| *B01D 46/44* | (2006.01) |
| *B01D 46/58* | (2022.01) |
| *B01D 46/62* | (2022.01) |
| *F02C 7/05* | (2006.01) |
| *B64C 27/04* | (2006.01) |

(52) U.S. Cl.
CPC ........... *B64D 33/02* (2013.01); *B01D 46/103* (2013.01); *B01D 46/446* (2013.01); *B01D 46/58* (2022.01); *B01D 46/62* (2022.01); *F02C 7/05* (2013.01); *B01D 2265/025* (2013.01); *B01D 2267/40* (2013.01); *B01D 2273/14* (2013.01); *B64C 27/04* (2013.01); *B64D 2033/022* (2013.01); *B64D 2033/0253* (2013.01)

(58) Field of Classification Search
CPC .... B64D 2033/0246; B64D 2033/0253; F02C 7/052; F02C 7/055; B01D 2273/16
See application file for complete search history.

(56) References Cited

U.S. PATENT DOCUMENTS

| | | | |
|---|---|---|---|
| 8,292,978 B2 | 10/2012 | Krahl | |
| 8,439,295 B2 | 5/2013 | Belyew | |
| 10,023,296 B2 | 7/2018 | Miller et al. | |
| 11,643,968 B2 | 5/2023 | Bacon et al. | |
| 2009/0139200 A1* | 6/2009 | Colaprisco | F04D 29/70 55/306 |
| 2018/0345762 A1* | 12/2018 | Bauer | B01D 53/0407 |
| 2020/0318542 A1* | 10/2020 | Gianopulos | B64C 39/02 |
| 2021/0215097 A1* | 7/2021 | Gons | F02C 7/055 |

FOREIGN PATENT DOCUMENTS

| | | | | |
|---|---|---|---|---|
| EP | 2969764 B1 | 11/2017 | | |
| WO | WO-2019197660 A1 * | 10/2019 | ......... | B01D 46/0021 |

* cited by examiner

Primary Examiner — Joshua J Michener
Assistant Examiner — Ka Chun Leung
(74) Attorney, Agent, or Firm — NORTON ROSE FULBRIGHT CANADA LLP

(57) ABSTRACT

A helicopter has an air inlet barrier filter (IBF) system including a guide rail extending axially along one side of a nacelle housing a helicopter engine. A filter panel is slidable along the guide rail for movement between a filtered position in which the filter panel covers an air inlet of the nacelle and an unfiltered position in which the filter panel uncovers a total surface area of the air inlet to provide for a fully unobstructed air flow to the engine.

18 Claims, 8 Drawing Sheets

AIR INLET BARRIER FILTER FOR A HELICOPTER

TECHNICAL FIELD

The application relates generally to aircrafts and, more particularly, to an air inlet barrier filter system.

BACKGROUND OF THE ART

Inlet barrier filters (IBF) are installed on aircrafts, in particular helicopters, for air-particle separation to keep foreign particles, such as sand/dust, from reaching the air intake of the aircraft engine. Potential for exposure to these airborne contaminants is greatest during takeoff and landing. If ingested, these foreign particles can damage the engine (e.g., compressor blade erosion, contamination of lubricants, etc.). While known IBFs have various advantages, there is still room in the art for improvement.

SUMMARY

In one aspect, there is provided a helicopter comprising: a nacelle having an air inlet; a turboshaft engine mounted inside the nacelle, the turboshaft engine having a compressor mounted for rotation about an axis, and an air inlet duct in fluid communication with the air inlet of the nacelle for directing ambient air to the compressor; and an air inlet barrier filter system including: a guide rail mounted to the nacelle and extending axially along one side of the nacelle; a first filter panel mounted for axial translation along the guide rail, the first filter panel moveable between a first axial position in which the first filter panel covers the air inlet and a second axial position in which the first filter panel uncovers a total surface area of the air inlet; and an actuator operatively connected to the first filter panel for axially moving the first filter panel between the first axial position and the second axial position.

In another aspect, there is provided an air inlet barrier filter system for protecting a helicopter engine from airborne contaminants, the air inlet barrier filter system comprising: an air inlet defined in a side-facing wall of a nacelle housing the helicopter engine; a first barrier filter panel including a frame and a filter material removably mounted to the frame; track rollers mounted to the frame; a guide rail mounted to the nacelle, the guide rail defining a first track channel along a fore-aft axis of the helicopter engine, the track rollers in riding engagement with the first track channel to allow for linear movement of the first barrier filter panel along the guide rail between a first position in which the first barrier filter panel covers the air inlet of the nacelle and a second position in which the first barrier filter panel lies outside of an outer boundary of the air inlet; and an actuator configured for translating the first barrier filter panel along the guide rail.

DESCRIPTION OF THE DRAWINGS

Reference is now made to the accompanying figures in which.

DETAILED DESCRIPTION

Figure 1:
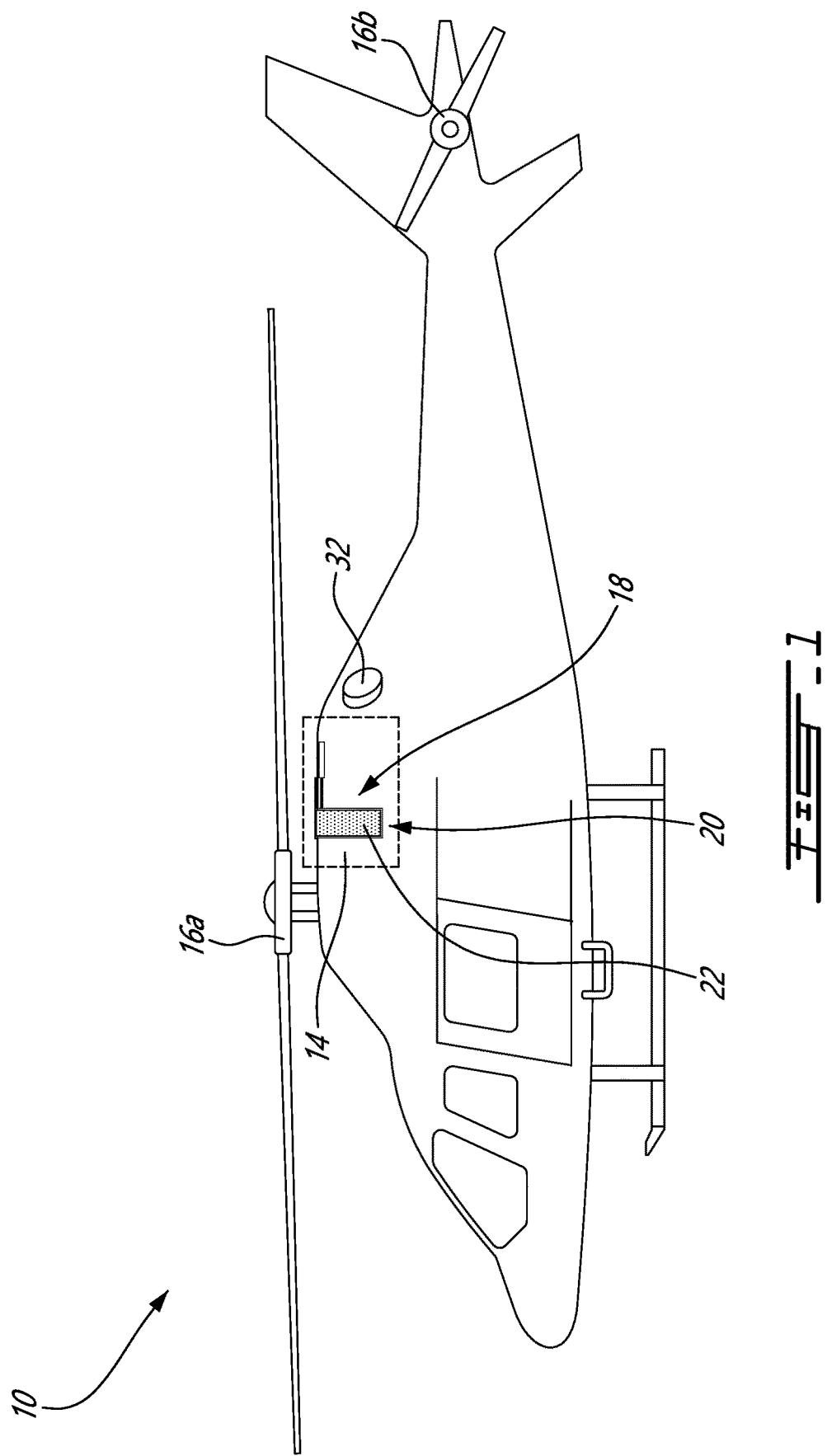
FIG. 1 is a schematic side view of a helicopter having an engine nacelle with side-facing air inlets equipped with air inlet barrier filter panels axially translatable along linear guide rails between a filtered position for filtering the ambient air before it reaches the helicopter engine and an unfiltered position in which up to 100% of unfiltered ambient air may be allowed to flow through the air inlets of the nacelle.

FIG. 1 illustrates an aircraft herein exemplified as a helicopter 10. The helicopter 10 generally includes a powerplant, for example, a turboshaft engine 12 (FIG. 2) housed in a nacelle 14. The turboshaft engine 12 is drivingly connected to a main rotor 16a and to a tail rotor 16b, as known in the art. As schematically illustrated in FIG. 1, the helicopter 10 has a side-facing air inlet 18 defined in the nacelle 14 for feeding ambient air to the turboshaft engine 12. As will be seen hereinafter, the helicopter 10 has an air inlet barrier filter system 20 including a first barrier filter panel 22 axially translatable between a first position (FIGS. 1 and 3) in which the first barrier filter panel 22 covers the air inlet 18 for filtering intake air prior to the air reaching the engine 12 and a second position (FIG. 4) in which the first barrier filter panel 22 fully clears/uncovers the air inlet 18 of the nacelle 14 to allow for a 100% unfiltered ambient air flow through the air inlet 18.

Figure 2:
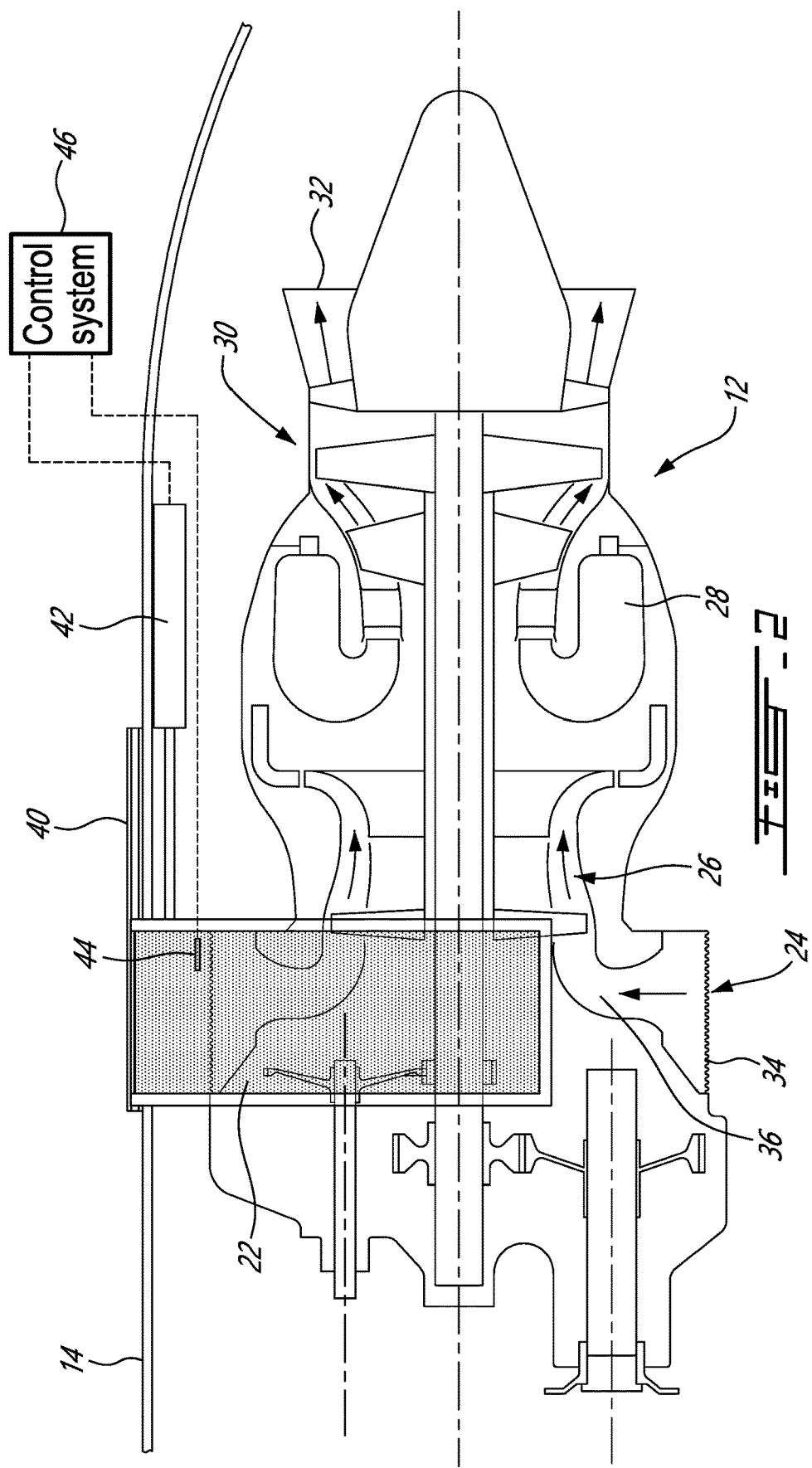
FIG. 2 is a schematic cross section view of the helicopter engine inside the nacelle and illustrating the position of the engine air intake relative to one of the side-facing air inlets and associated air inlet barrier filter panel of the nacelle.
Figure 3:
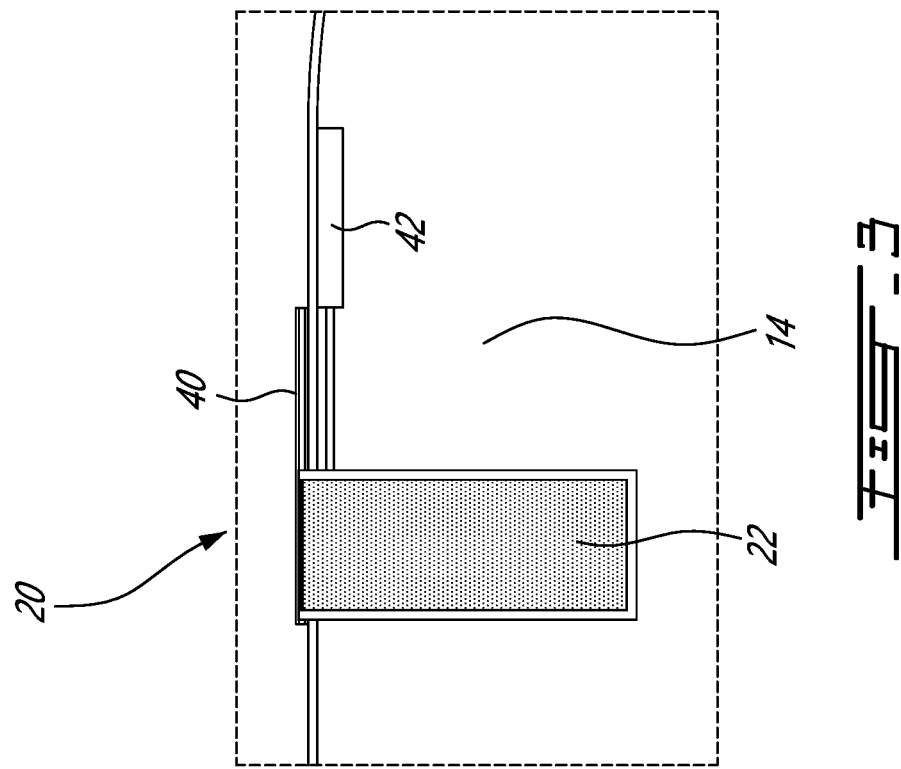
FIG. 3 is an enlarged view of a side portion of the helicopter illustrating the air inlet barrier filter panel in its filtered position in which the side-facing air inlet is fully covered by the barrier filter panel.

As shown in FIG. 2, the turboshaft engine 12 is mounted inside the nacelle 14 and generally comprises in serial flow communication a radial air intake 24 in fluid flow communication with the nacelle air inlet 18, the air intake 24 configured for admitting pre-filtered or unfiltered ambient air into the engine 12, a compressor section 26 for pressurizing the air received from the radial air intake 24, a combustor 28 in which the compressed air is mixed with fuel and ignited for generating an annular stream of hot combustion gases, a turbine section 30 for extracting energy from the combustion gases, and an exhaust outlet 32 through which the combustion gases exit the engine 12.

In some embodiments, the air intake 24 of the engine 12 extends circumferentially around the engine centerline CL to define a 360 degrees air admission area around the engine case. A filter 34 in the form of a mesh screen or the like extends across the engine air intake 24 to filter the air received from the air inlet 18 of the nacelle 14. An air inlet duct 36 extends from the air intake 34 to the compressor section 26. In some embodiments, the inlet duct 36 extends from a radial direction to an axial direction towards the compressor section 26.

Helicopters, such as the one described above, are often used in harsh environments in which the helicopter's systems are exposed to airborne contamination including sand, abrasive dust, corrosive salt, and high moisture. These contaminants are known to cause engine erosion, wear, and damage, requiring more frequent overhauls, as well as unscheduled component removals. Filters are thus used to trap contaminants (e.g., airborne particles) prior to the air being ingested by the engine. However, the presence of filters, such as IBFs, at the engine air intake can lower the overall engine performance as the fluid drag on the filter's fibers decreases the inlet pressure. Additionally, a clogged filter will impede the flow of air through the engine air intake, thereby resulting in lower engine performance. Some helicopter operators even choose to fly without an IBF, preferring to take on the increased maintenance cost rather than sacrificing the engine performance. It was thus proposed to equipped IBF installations with bypass-air doors to let helicopter pilots continue operation if a filter becomes clogged. However, the integration of such bypass-air doors adds complexity and costs. Furthermore, the air admission area of such bypass-air doors is significantly smaller than the air inlet area covered by the IBF, again resulting in lower engine performance.

The IBF system 20 eliminates the need for such bypass-air doors and at least in some embodiments the IBF system 20 allows to fully preserve the air admission area of the air inlet 18 when operated in an unfiltered mode. Referring to FIGS. 2-7, it can be appreciated that the first filter panel 22 of the IBF system 20 is axially translatable along a linear guide rail 40 to selectively cover or uncover the air inlet 18. In some embodiments, the guide rail 40 is mounted to an outer surface of the nacelle 14 above the air inlet 18. According to another embodiments, the guide rail 40 may be integrated inside a pocket in the nacelle 14 and the first filter panel 22 may be slidable in and out of the pocket to selectively cover or uncover the air inlet 18. While only one guide rail 40 is shown in the drawings, it is understood that additional guide rails could be provided to support the filter panel 22 on the nacelle 14. For instance, the filter panel 22 could be slidably engaged with a second guide rail at the bottom of the air inlet 18 to provide added stability. The filter panel 22 would thus slide between a top and a bottom guide rail.

As shown in FIGS. 1 to 4, the guide rail 40 extend axially in parallel to the engine CL to allow the first filter panel 22 to be selectively slid in a fore or an aft direction of the helicopter 10. The guide rail 40 axially spans the air inlet 18 and project axially on at least one of a fore and an aft side of the air inlet 18. According to the embodiment illustrated in FIGS. 1 to 4, the guide rail 40 has an aft portion projection axially aft from the air inlet 18, thereby allowing the filter panel 22 to be displaced axially aft of the air inlet 18 in order to fully uncover the air inlet 18 and, thus, allow the helicopter 10 to be selectively operated without the IBF. In this way, the filter panel 22 can be disposed downstream of the air inlet 18 relative to the incoming flow of air. This may be advantageous from an aerodynamic point of view in that such a backward disposition of the air filter panel 22 does not interfere with the flow of incoming air through the air inlet 18.

Figure 4:
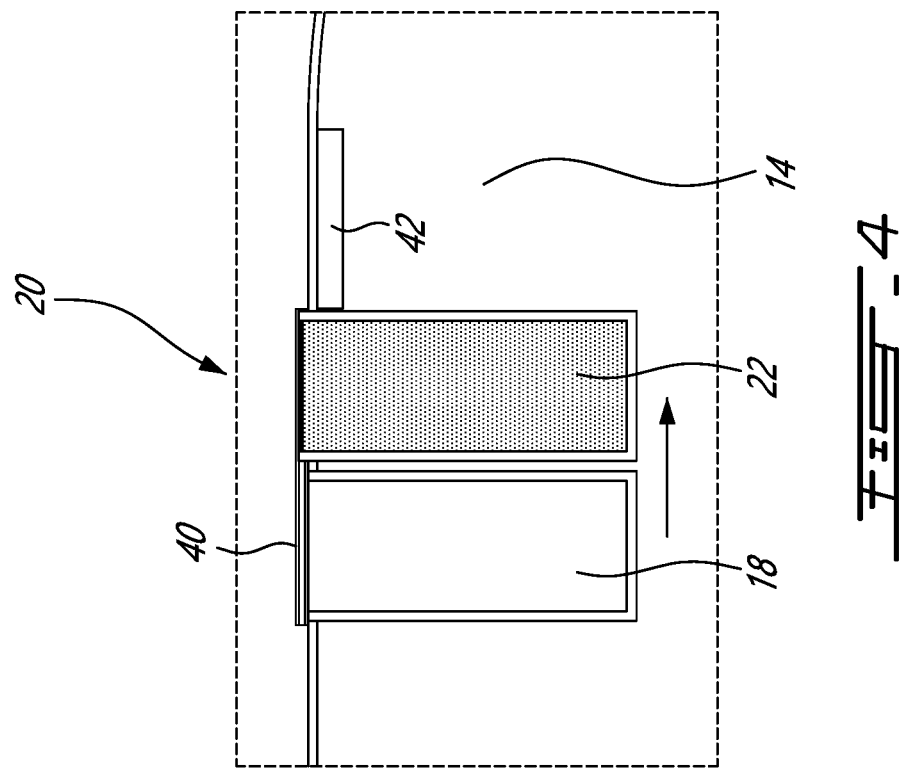
FIG. 4 is an enlarged view of the side portion of the helicopter illustrating the air inlet barrier filter panel in its unfiltered position in which the side-facing air inlet is fully uncovered.

The IBF system 20 further comprises an actuator 42 operatively connected to the first filter panel 22 for axially moving the first filter panel 22 between its first position (FIG. 3) and its second position (FIG. 4). The actuator 42 can take various forms, such as an electric motor, a pneumatic or a hydraulic cylinder just to name a few. As shown in FIG. 2, it can be appreciated that in some embodiments, the IBF system 20 further comprises a sensor 44 to measure differential air pressure across the filter panel 22. The sensor 44 is operatively connected to a control system 46 configured to receive signals from the sensor 44 and to process the signals. For instance, the control system 46 may include a warning light or display inside the helicopter cockpit. The warning light or display conveys operational information of the filter panel 22 to the pilot, such as the pressure differential. The warning light or display may indicate a decreased flow of air through the filter panel 22 and, thus, into the air inlet 18. A switch located within the cockpit may allow the pilot to manually control the positions of filter panel 22. The pilot may activate the actuator 42 through manual activation of the switch to selectively partially or fully uncover the air inlet 18. In some embodiments, the control system 46 may also be operatively connected to the actuator 42 to automatically send control commands to the actuator 42 to displace the filter panel 22 between its first and second positions in response to the signals received from the sensor 44. For instance, upon detecting that the filter panel 22 is clogged above a predetermined threshold, the control system 46 could automatically send a control command to the actuator 42 to displace the filter panel 22 axially away from the air inlet 18, thereby allowing unfiltered air to flow through the air inlet 18. Accordingly, depending on the clogged state of the barrier filter panel 22 and/or the flight condition of the helicopter 10, the barrier filter panel 22 can be axially displaced to selectively cover or uncover the air inlet 18. For instance, in flight conditions with low airborne contaminants, the barrier filter panel 22 could be displaced to its second position (FIG. 4) to uncover a total surface area of the air inlet 18. This would allow to enhance the performance of the helicopter engine 12. In other flight conditions, such as takeoff and landing in dust or sand environments, the barrier filter panel 22 can be axially slid along the guide rail 40 to its first position (FIG. 3) to fully cover the air inlet 18 and, thus, protect the engine 12 from the airborne particles contained in the flow of air drawn through the air inlet 18.

Figure 5:
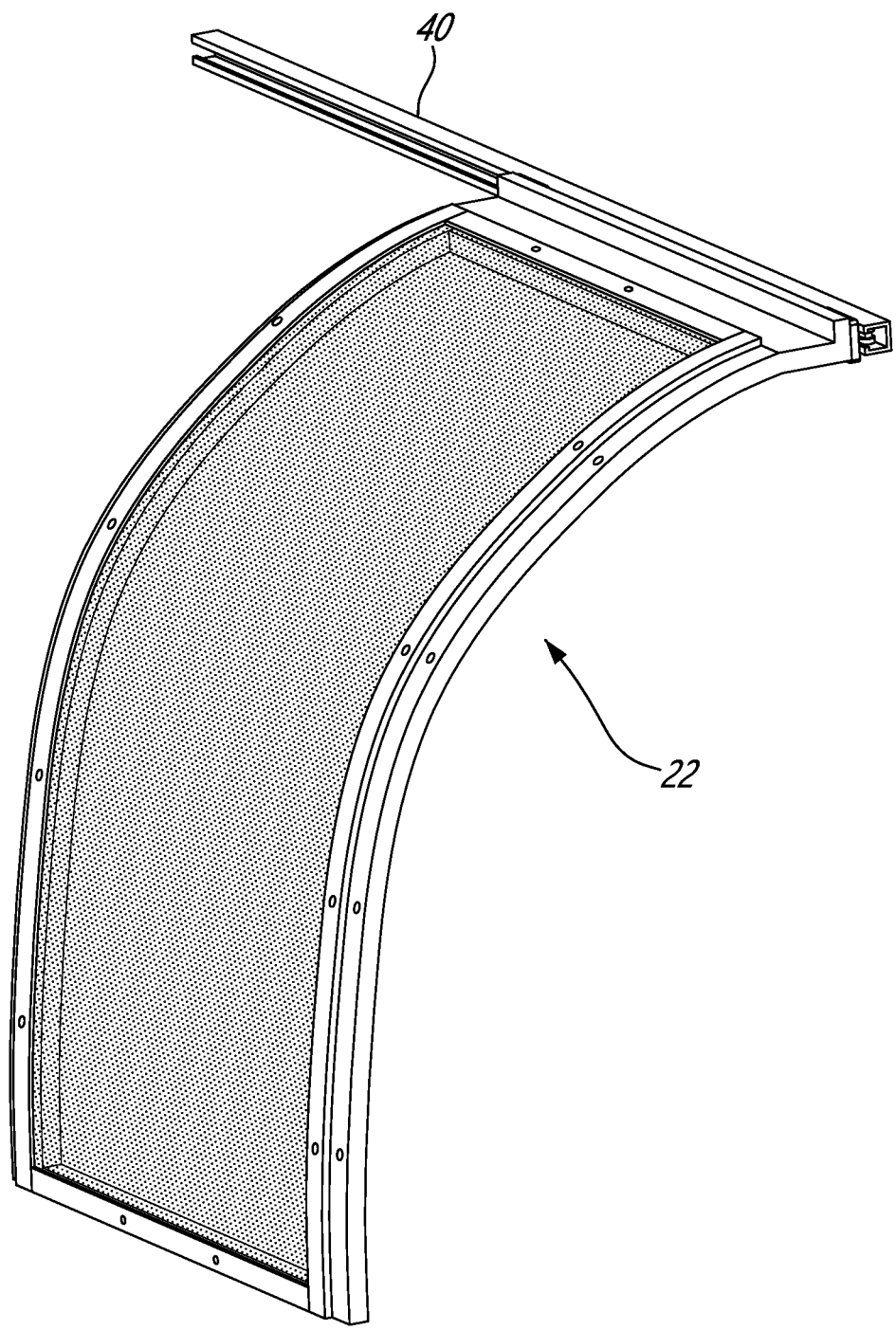
FIG. 5 is a 3D view illustrating an embodiment of the air inlet barrier filter panel slidably mounted to a liner guide rail.
Figure 6:
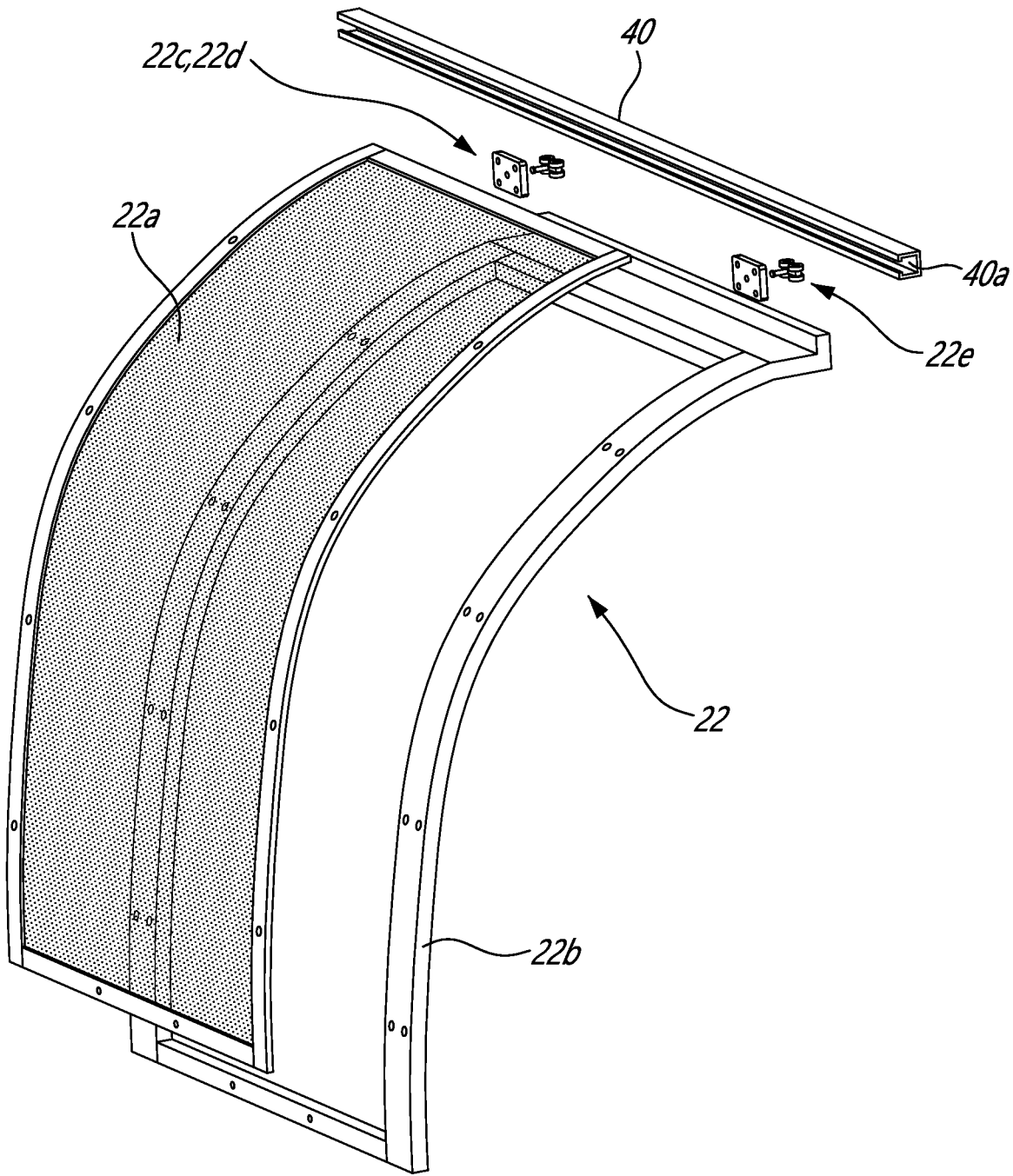
FIG. 6 is an exploded 3D view of the air inlet barrier filter panel and guide rail assembly of FIG. 5.
Figure 7:
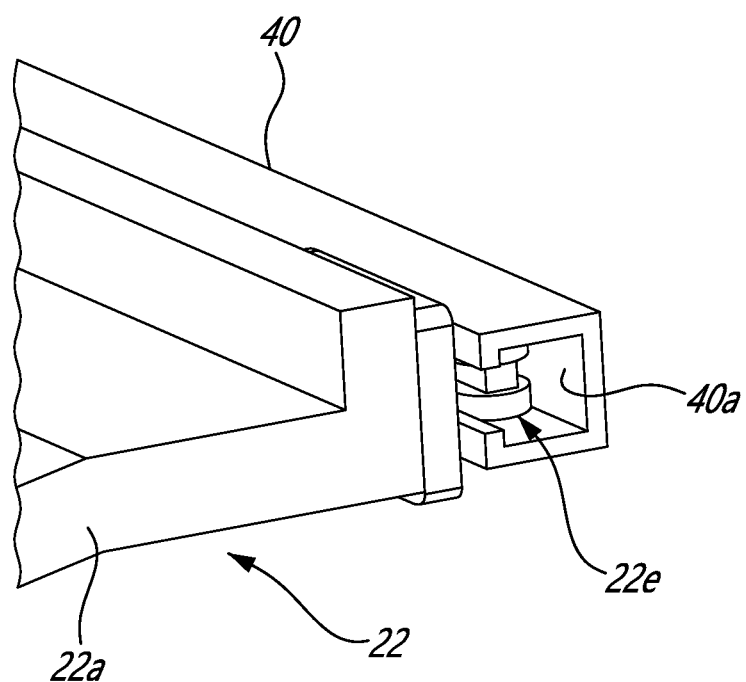
FIG. 7 is an enlarged view illustrating details of the track rollers and guide rail of the air inlet barrier filter panel.

Referring jointly to FIGS. 5-7, it can be appreciated that the first filter panel 22 comprises a filter 22a, such as a screen, removably mounted to a peripheral frame 22b. The filter 22a may comprise any suitable filter media for trapping airborne particles. The filter panel 22 further comprises a carrier 22c mounted to a top side of the peripheral frame 22b for riding engagement with the guide rail 40. According to some embodiments, the carrier 22c includes two sets of track rollers 22d, 22e (FIG. 6) removably fastened to the opposed axial end portions of the top side of the peripheral frame 22b of the barrier filter panel 22. The track rollers 22d, 22e are engaged in a track, for instance in the form of a roller channel 40a, formed in the linear guide rail 40. As shown in FIG. 7, the roller channel 40a has a C-shaped cross-section for captively retaining the track rollers 22d, 22e.

Figure 8:
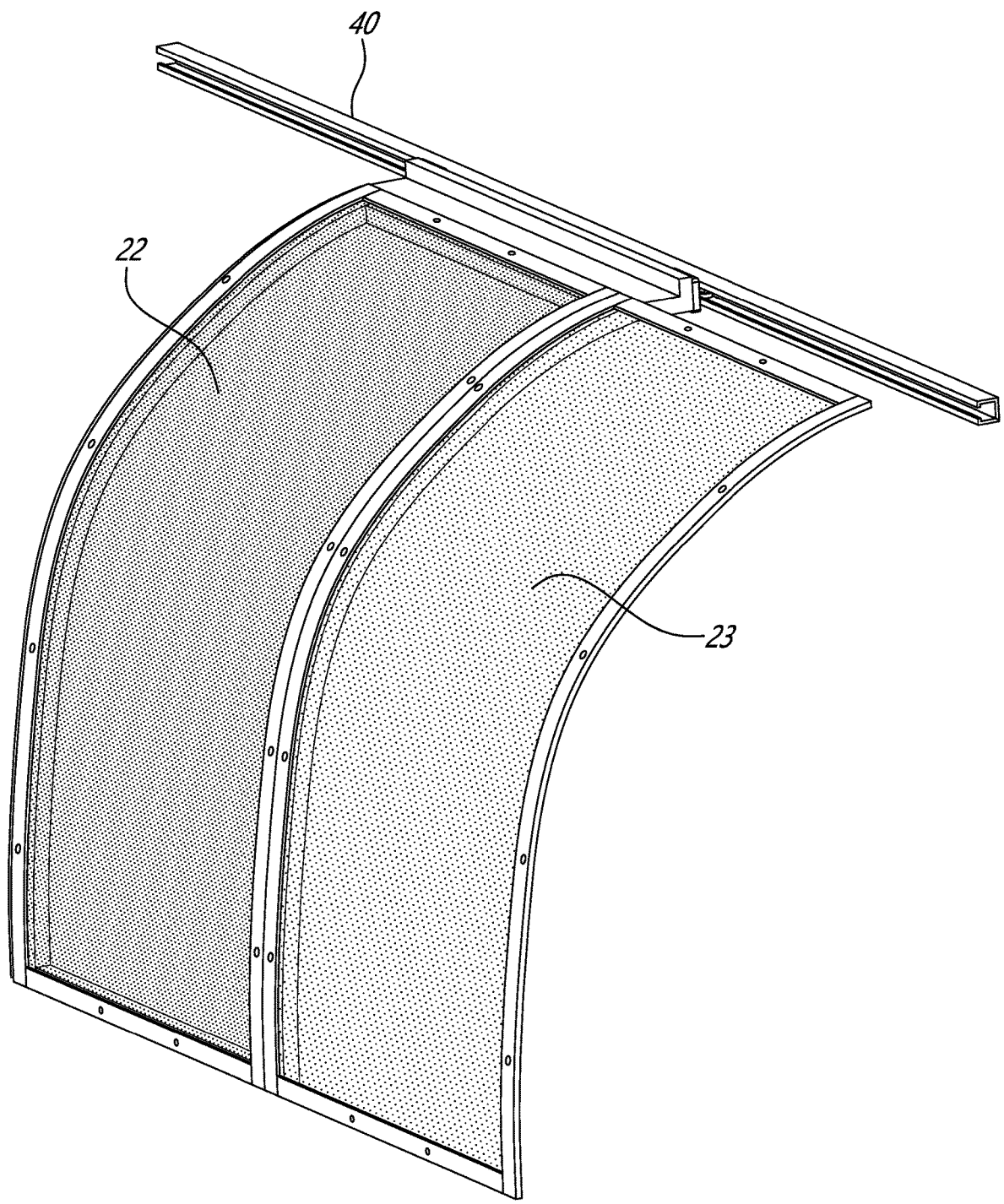
FIG. 8 is an enlarged view of another embodiment of an inlet barrier filter assembly including a pair of filter panels having different filtering capacities.

Now referring to FIG. 8, it can be appreciated that in some embodiments, the air inlet barrier filter system 20 further comprises a second filter panel 23. In some embodiments, the first and second filter panels 22, 23 may have different filtering grades for capturing different sizes of airborne particles. For instance, the filter media of the first filter panel 22 may be configured to trap finer particles than the second filter panel 23. Accordingly, depending on the environment in which the helicopter 10 is flying, a selected one of the first and second filter panels 22, 23 can be used to filter incoming air as it is drawn through the air inlet 18 of the nacelle 14. In other embodiments, the first and second filter panels 22, 23 may have the same filtering grade. Accordingly, when the first filter panel 22 becomes clogged above a predetermined threshold, the first and second filter panels 22, 23 can be displaced to move the first filter panel 22 away from the air inlet 18 and cover the air inlet 18 with the second unclogged filter panel 23 and vice versa. This allows to have a backup filter panel ready for use at all times.

Still referring to FIG. 8, it can be seen that the first and second filter panels 22, 23 may be disposed side-by-side in a coplanar relationship for movement along the guide rail 40. According to the illustrated embodiment, the second filter panel 23 is rigidly connected in series to the first filter panel 22. Accordingly, the exemplified first and second filter panels 22, 23 are jointly movable as a unitary filter body for movement along the guide rail 40 between a first axial position in which the first filter panel 22 covers the air inlet 18, an intermediate axial position in which the second filter panel 23 covers the air inlet 18, and a second axial position in which both the first and second filter panels 22, 23 are disposed axially adjacent to the air inlet 18 outside of the boundary or outline of the air inlet 18 to allow 100% of unfiltered air through the air inlet 18.

Figure 9:
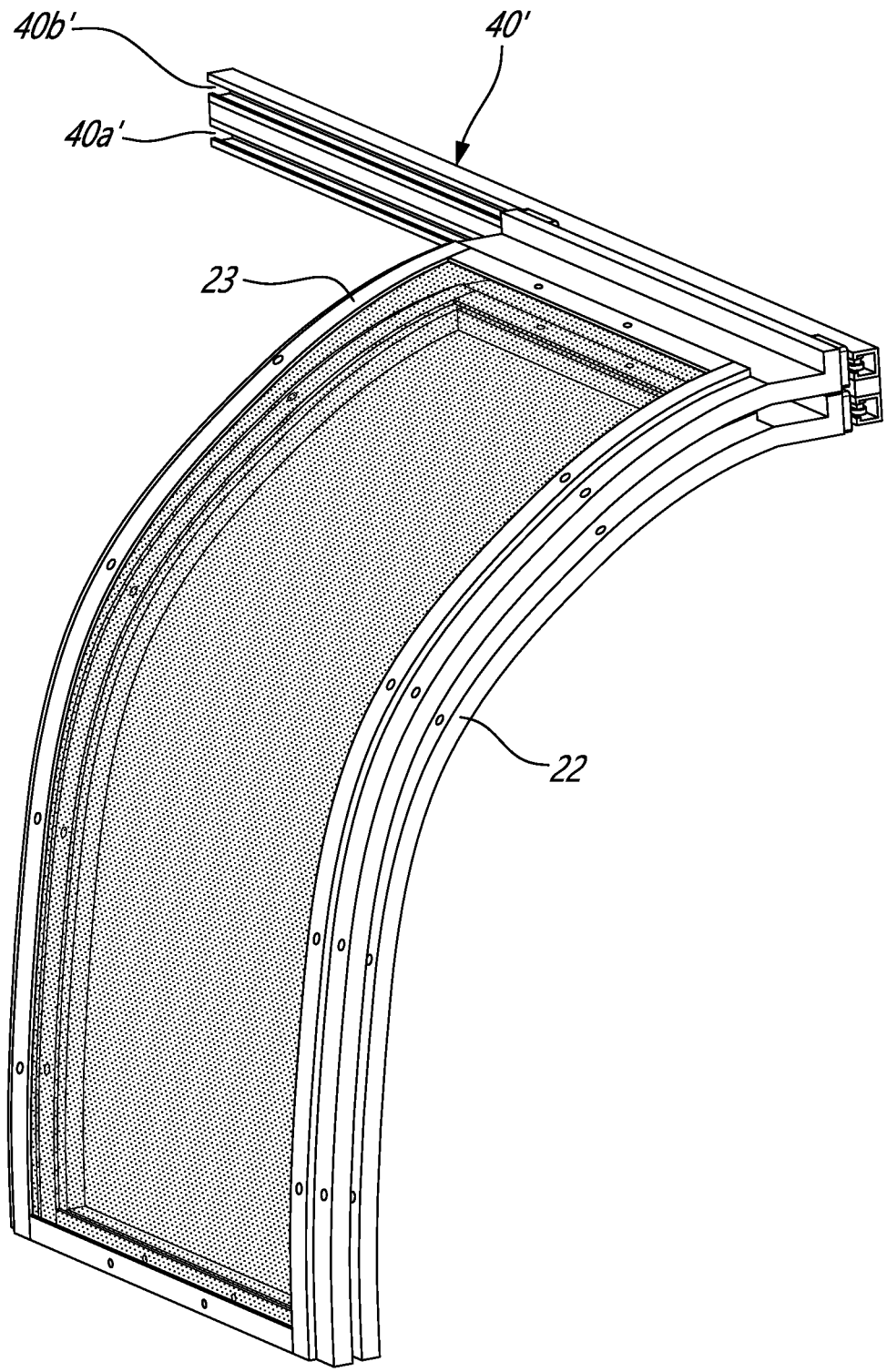
FIG. 9 is a schematic view of a further embodiment of an inlet barrier filter assembly including stackable filter panels separately moveable in respective tracks of a multi-track guide rail.

According to some embodiments, the first and second filter panels 22, 23 could be independently moveable relative to one another along the guide rail 40. In such instances, the first and second panels 22, 23 could be displaceable in the same track or in different tracks. FIG. 9 illustrates an embodiment in which each filter panel is displaceable in its own track. As shown in FIG. 9, the guide rail could be provided in the form of a multi-track guide rail 40' having a first track 40a' and a second track 40b' parallel to the first track 40a', the first and second tracks 40a', 40b' extending side-by-side. The first filter panel 22 is translatable along the first track 40a', whereas the second filter panel 23 is translatable along the second track 40b'. As shown in FIG. 9, the first and second filter panels 22, 23 are stackable one over the other. Accordingly, the first and second panels 22, 23 can be superposed one over the other in the first or filtered position and the second or unfiltered position. Such a multi-track configuration with stackable filter panels allows to minimize the length of the guide rail (i.e., it provides for a more axially compact IBF system). It also allows to selectively use different barrier filter panels for filtering the air drawn through the air inlet 18.

It can be appreciated from the foregoing that the barrier filter system 20 allows to remove the barrier filter panel from the air inlet 18 in some flight conditions to avoid engine performances losses due to a clogged barrier filter. At least in some embodiments, the barrier filter system 20 allows to uncover a total surface area of the air inlet 18, thereby allowing to maximize the quantity of air that can be ingested by the engine 12. Such a barrier filter system 20 in which 100% of the incoming air may be filtered before being ingested by the engine 12 or in which 100% of the air may be unfiltered prior to reaching the engine 12 helps to balance the need for engine protection and engine performance. Indeed, by having the possibility of fully uncovering the air inlet 18, for instance, when flying at high altitude, the performance of the engine 12 can be improved and, thus, fuel consumption can be reduced.

The axial sliding arrangement of the barrier filter panel along the fore-aft direction of the aircraft may be advantageous from an integration point of view. It provides for a readily accessible and compact barrier filter system. In practice, the space available between the nacelle and the engine case is limited and not readily accessible. Furthermore, there is already several components, such as piping and various mounting features between the nacelle 14 and the engine case, thereby leaving little room for movement in the circumferential direction around the engine case. The use of an axially linearly movable barrier filter panel on the nacelle 14 eliminates any such considerations. Furthermore, the skilled person will appreciate that the retrofitting of existing helicopters with a moveable barrier filter panel is facilitated/simplified by the use of an external IBF system with axially linearly movable barrier filter panels.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. A helicopter comprising:
a nacelle having an air inlet;
a turboshaft engine mounted inside the nacelle, the turboshaft engine having a compressor mounted for rotation about an axis, and an air inlet duct in fluid communication with the air inlet of the nacelle for directing ambient air to the compressor; and
an air inlet barrier filter system including:
a guide rail mounted to the nacelle and extending axially along one side of the nacelle;
a first filter panel mounted for axial translation along the guide rail, the first filter panel moveable between a first axial position in which the first filter panel covers the air inlet and a second axial position in which the first filter panel uncovers a total surface area of the air inlet; and
an actuator operatively connected to the first filter panel for axially moving the first filter panel between the first axial position and the second axial position,
wherein the air inlet barrier filter system further comprises a carrier mounted to the first filter panel, the carrier in riding engagement with the guide rail; and
wherein the guide rail defines a roller channel, and wherein the carrier includes track rollers movable inside the roller channel.

2. The helicopter according to claim 1, wherein the air inlet barrier filter system further comprises a second filter panel, and wherein the first and second filter panels have different filtering grades for capturing different sizes of airborne particles.

3. The helicopter according to claim 2, wherein the first and second filter panels are disposed side-by-side in a coplanar relationship, the first and second filter panels jointly movable as a unitary filter body along the guide rail, and wherein the unitary filter body is displaceable along the guide rail between the first axial position in which the first filter panel covers the air inlet, an intermediate axial position in which the second filter panel covers the air inlet, and the second axial position in which both the first and second filter panels are disposed axially adjacent to the air inlet outside of a boundary outline of the air inlet.

4. The helicopter according to claim 2, wherein the first and second filter panels are moveable relative to one another along the guide rail.

5. The helicopter according to claim 4, wherein the guide rail has a first track and a second track parallel to the first track, the first and second tracks disposed side-by-side, the first filter panel translatable along the first track, the second filter panel translatable along the second track, and wherein the first and second filter panels are stackable one over the other.

6. The helicopter according to claim 5, wherein the first and second filter panels are selectively and separately moveable to and from the air inlet.

7. The helicopter according to claim 1, wherein the air inlet barrier filter system further comprises a sensor configured to measure a pressure drop across the first filter panel.

8. The helicopter according to claim 1, wherein the air inlet is a side-facing air inlet defined in a side of the helicopter, and wherein the guide rail has a rear portion extending axially to a location aft of the side-facing air inlet and toward a tail of the helicopter, the first filter panel movable along said rear portion of the guide rail when displaced to second axial position.

9. An air inlet barrier filter system for protecting an engine of a helicopter from airborne contaminants, the air inlet barrier filter system comprising:
an air inlet defined in a side-facing wall of a nacelle of the helicopter, the nacelle housing the engine;
a first barrier filter panel including a frame and a filter material removably mounted to the frame;
track rollers mounted to the frame;
a guide rail mounted to the nacelle, the guide rail defining a first track channel along a fore-aft direction of the helicopter, the track rollers in riding engagement with the first track channel to allow for linear movement of the first barrier filter panel along the guide rail between a first position in which the first barrier filter panel covers the air inlet of the nacelle and a second position in which the first barrier filter panel lies outside of an outer boundary of the air inlet; and
an actuator configured for translating the first barrier filter panel along the guide rail.

10. The air inlet barrier filter system according to claim 9, further comprising a second barrier filter panel, the first and second barrier filter panels having different filtering grades.

11. The air inlet barrier filter system according to claim 10, wherein the first and second barrier filter panels are independently moveable along the guide rail.

12. The air inlet barrier filter system according to claim 11, wherein the guide rail includes a second track channel, the second barrier filter panel moveable inside the second track channel.

13. The air inlet barrier filter system according to claim 12, wherein the first track channel and the second track channel are disposed side-by-side along the guide rail.

14. The air inlet barrier filter system according to claim 12, wherein the first and second barrier filter panels are stackable one over the other.

15. The air inlet carrier filter system according to claim 12, wherein the first and second barrier filter panels are disposed consecutively to one another along the guide rail for movement inside the first track channel.

16. The air inlet carrier filter system according to claim 15, wherein the first and second barrier filter panels are rigidly connected to one another for joint movement along the guide rail.

17. The air inlet carrier filter system according to claim 9, further comprising a second barrier filter panel, the first and second barrier filter panels selectively positionable over the air inlet.

18. The air inlet carrier filter system according to claim 17, wherein the first and second barrier filter panels are selectively positionable one over the other.

* * * * *